United States Patent

Katzenschwanz

[11] Patent Number: 6,056,134
[45] Date of Patent: May 2, 2000

[54] SAFETY DEVICE FOR A STORAGE DEVICE

[75] Inventor: Bernhard Katzenschwanz, Krumbach, Germany

[73] Assignee: Megamat GmbH Buro+Lagertechnik, Neuburg, Germany

[21] Appl. No.: 09/155,954

[22] PCT Filed: Apr. 8, 1997

[86] PCT No.: PCT/EP97/01739

§ 371 Date: Oct. 8, 1998

§ 102(e) Date: Oct. 8, 1998

[87] PCT Pub. No.: WO97/37564

PCT Pub. Date: Oct. 16, 1997

[30] Foreign Application Priority Data

Apr. 8, 1996 [DE] Germany .......................... 296 06 381

[51] Int. Cl.[7] ..................................................... A47F 5/00
[52] U.S. Cl. ..................... 211/187; 211/1.57; 414/280; 414/268
[58] Field of Search ..................................... 211/187, 151, 211/1.51, 1.57, 121; 312/306; 198/504; 414/276, 280, 268

[56] References Cited

U.S. PATENT DOCUMENTS

| 4,609,096 | 9/1986 | Doty .................................... 198/524 X |
| 4,650,264 | 3/1987 | Dahnert ................................ 211/121 X |
| 5,211,296 | 5/1993 | D'Heygere ........................... 211/1.57 X |
| 5,544,996 | 8/1996 | Castaldi et al. ........................... 414/280 |
| 5,687,858 | 11/1997 | Bouche .................................... 211/121 |

FOREIGN PATENT DOCUMENTS

| 0254088 | 1/1988 | European Pat. Off. . |
| 0383257 | 8/1990 | European Pat. Off. . |
| 3514932 | 10/1986 | Germany . |
| 3631602 | 4/1988 | Germany . |
| 3714638 | 12/1988 | Germany . |
| 4201991 | 10/1993 | Germany . |
| 4342083 | 6/1995 | Germany . |

OTHER PUBLICATIONS

Patent Abstracts of Japan, vol. 016, No. 376 (M–1294), Aug. 12, 1992 & JP 04 121303 A (DAIFUKU), Apr. 22, 1992.

Primary Examiner—Robert W. Gibson, Jr.
Attorney, Agent, or Firm—Knobbe, Martens, Olson & Bear, LLP

[57] ABSTRACT

A safety device for use in a storage apparatus includes a protective device and movable covers. The storage apparatus includes a plurality of carriers for stored goods, an opening for stocking or unstocking goods on the carriers and a drive having drive elements for selectively moving the carriers to the opening. The opening has an upper edge and a lower edge. The lower edge is in the proximity of a plane in which the goods are stocked or unstocked. A protective device is associated with at least one of the upper and lower edges of the opening, and configured to stop the drive upon intervention, so that the opening is protected in a vertical direction. The plane has side regions where covers are arranged and configured to cover the drive elements. The covers are movable together with the movement of the carriers and coupled to safety switches for stopping the drive.

18 Claims, 2 Drawing Sheets

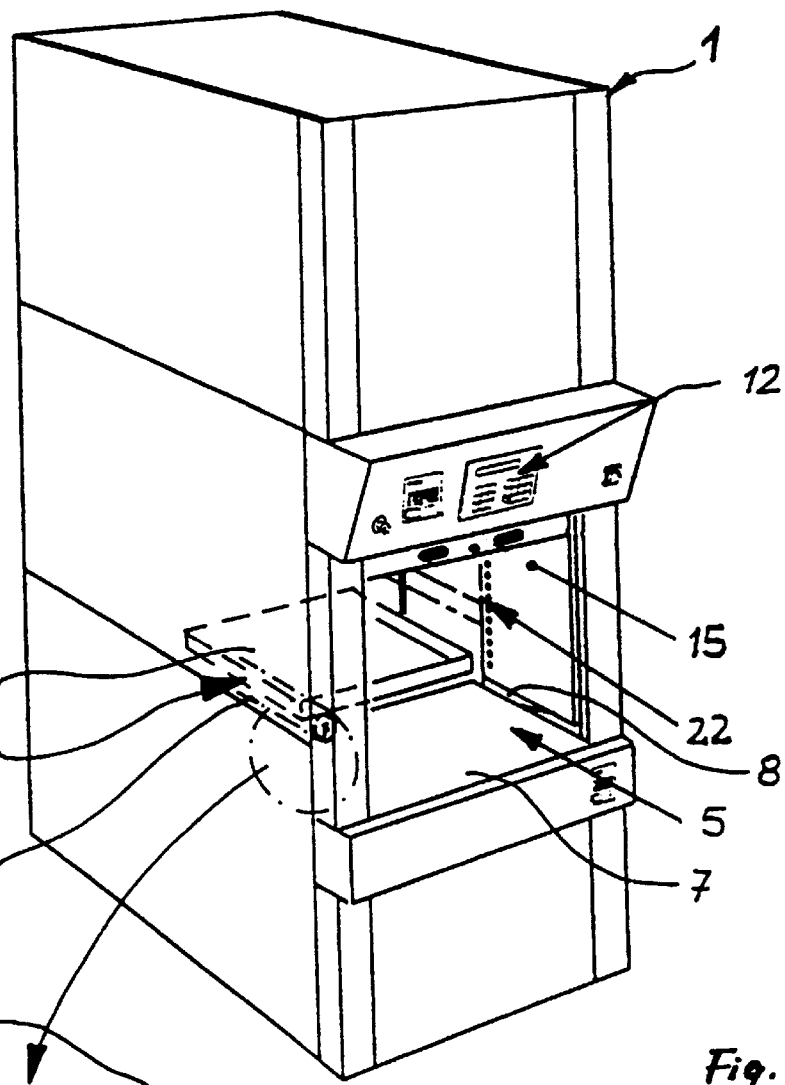
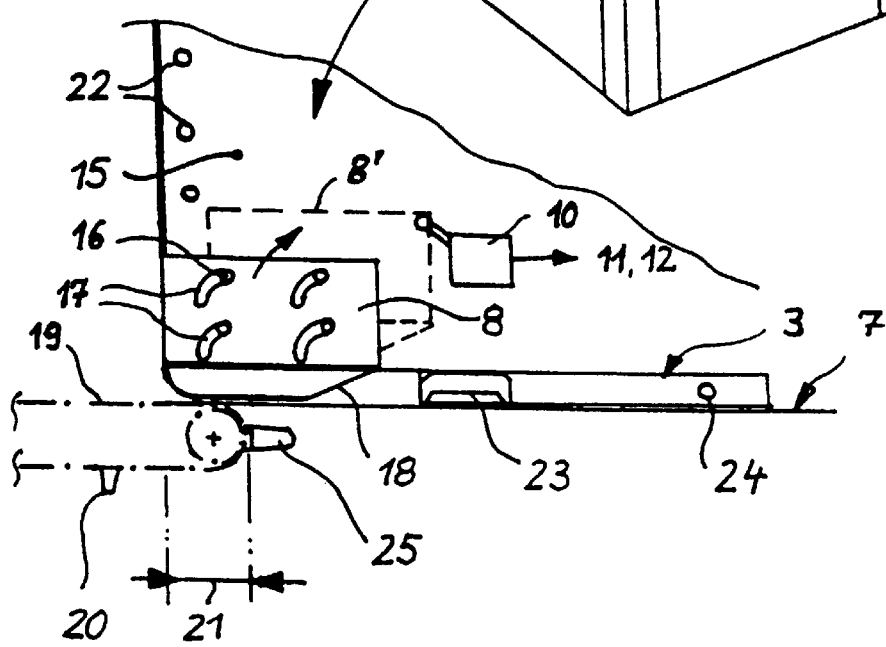
Fig. 1
Fig. 3

SAFETY DEVICE FOR A STORAGE DEVICE

FIELD OF THE INVENTION

This invention relates to a safety device for a storage device in the form of a mechanical cupboard with a plurality of stored goods carriers, which can be moved by a drive selectively to a stocking/un-stocking opening, wherein an upper and/or a lower edge of the stocking/un-stocking opening is protected by a protective device, especially a light barrier or a switch rail stopping the drive on intervention.

BACKGROUND OF THE INVENTION

Such a safety device is know from FR-A 2 210 271. A mechanical cupboard is described therein, in which a plurality of cassette-like stored goods carriers can be slid in and out in two side racks. In between these two right and left stacked columns a feed platform can be driven in the height direction, so that individual stored goods carriers can be removed from the racks and be fed to an opening for taking out of stock (un-stocking). The withdrawal of the individual cassette-like stored goods carriers is effected by a magnet, which can be coupled to the front side of the stored goods carrier. Since however this withdrawing magnet has a certain structural length, by which the lateral width extent of the feed platform has to be extended, compact chain drives are finding increasing use for such devices for stocking and un-stocking load carriers in a rack or from a rack, as are described in DE 4 233 690 or DE 3 830 218 for example. Two chains parallel to one another are provided as drive lines, which run round diverting rollers and engage each selected stored goods carriers at the sides by means of pin-formed entraining elements.

In the first-mentioned state of the art the stocking/un-stocking opening is protected by a plurality of light barriers, in order to prevent intervention in the space of movement of the feed platform movable in height or on intervention to stop the drive straight away, in order to avoid injury to the operator. In the region of the circulating cupboard (paternoster cupboard) contact or switch rails are also known at the upper and/or lower edge of the stocking/un-stocking opening, which immediately stop the drive on forceful contact therewith.

Although both kinds of protective device have basically proved themselves as safety devices, it is disadvantage, particularly with the light barriers, that many operators do not wait for the feed platform to stop when store goods are arriving, but reach into the stocking/un-stocking opening, so that far too many "emergency stops" occur. This applies also to a removal or stocking table preceding the mechanical cupboard.

SUMMARY OF THE INVENTION

Accordingly the invention is based on the object of providing a safety device with which an optimum standard of safety is obtained while unnecessary responses are largely avoided.

This object is met by a safety device for use in a storage apparatus having a plurality of carriers for stored goods, an opening for stocking or unstocking goods on the carriers and a drive having drive elements for selectively moving the carriers to the opening. The opening has an upper edge and a lower edge. The lower edge is in the proximity of a plane in which the goods are stocked or unstocked. A protective device is associated with at least one of the upper and lower edges of the opening, and configured to stop the drive upon intervention, so that the opening is protected in a vertical direction. The plane has side regions where covers are arranged and configured to cover the drive elements. The covers are movable together with the movement of the carriers and coupled to safety switches for stopping the drive.

By means of the covers for the drive elements, such as chain drives, additionally arranged at the side regions of the stocking/un-stocking opening, the intervention space otherwise exposed at the sides is completely covered, so that contact of an operator with drive elements if ruled out, especially getting squashed on circulating chains or diverting wheels or on the feed platform during its vertical movement. Since in addition the movement of the covers in question is coupled to the stocking/un-stocking movement of the stored goods carrier, the result is that no additional drive is needed for the covers, but these covers are actuated in common with the stocking/un-stocking movement. It is especially advantageous to use this safety device in storage devices with a vertically movable feed platform which is arranged in the storage device recessed into the rack front. A region is thus created at the stocking/un-stocking opening where the operator can handle without danger, while the dangerous region lying further in is optimally protected, in particular also by the upper, stationary switch rail and the lower switch rail moving together with the feed platform.

Further advantageous arrangement are the subject matter of the dependent claims.

BRIEF DESCRIPTION OF THE DRAWINGS

An embodiment of the safety device will now be described and explained in more detail with reference to the drawings, in which:

FIG. 1 is a perspective view of a storage device;

FIG. 3 is an enlarged view of a movable cover.

Figure 2:
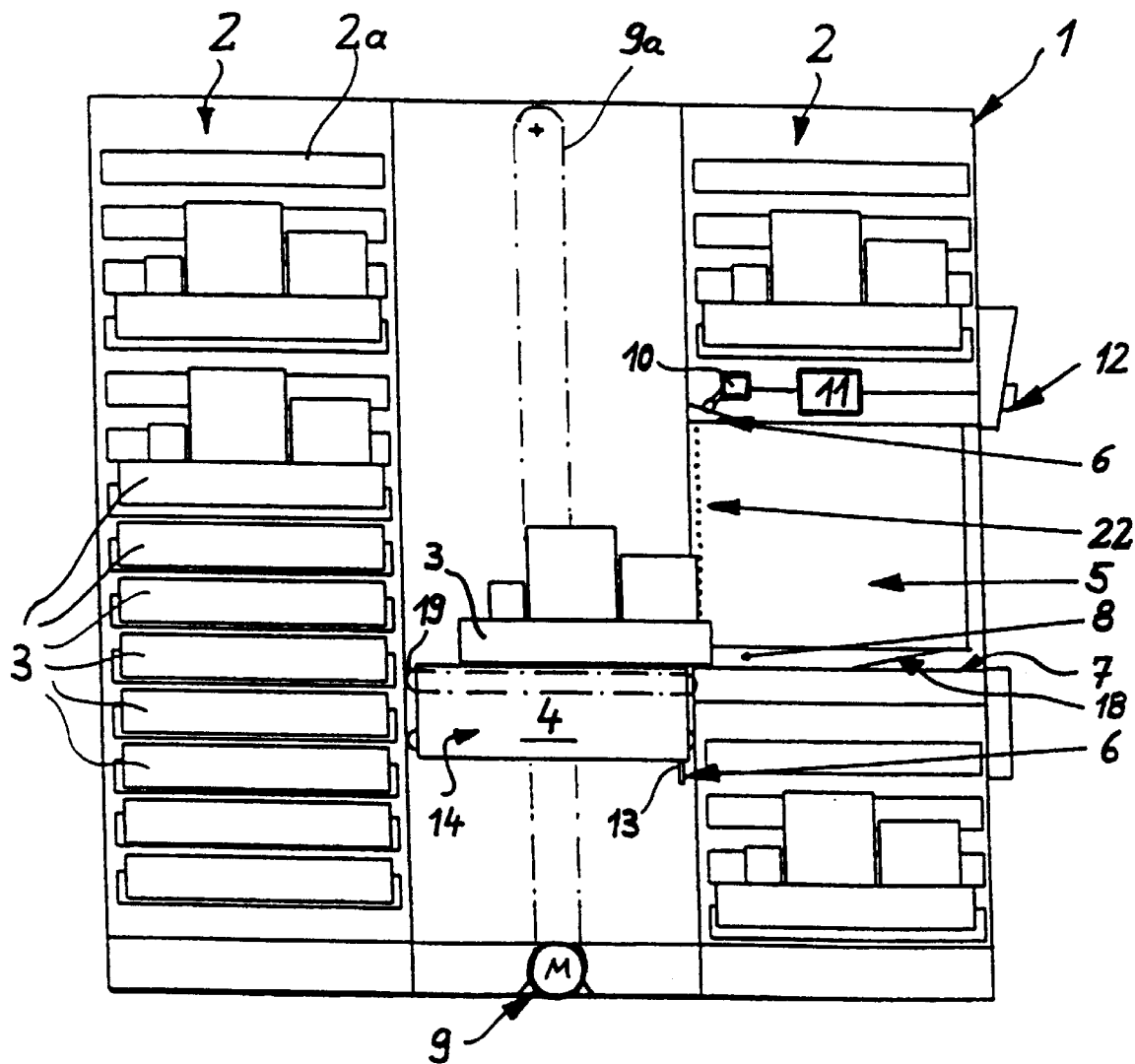
FIG. 2 is a sectional view of the storage device according to FIG. 1.

A perspective view of a storage device is shown in FIG. 1, in the form of a mechanical cupboard, which consists essentially of two racks 2 arranged behind one another (cf. also FIG. 2), in which a plurality of flat stored goods carriers 3 can be positioned on side supporting angle sections 2a. The stored goods carriers 3 are fetched by a feed platform 4 from a stocking/un-stocking opening 5 and transported to a specific compartment in the rack 2. Un-stocking is effected in reverse manner, in that the respective stored goods carrier 3 is drawn from the corresponding carrier angle sections 2a at a predetermined place of the rack 2, is then moved by the feed platform 4 to the stocking/un-stocking plane 7 of the stocking/un-stocking opening 5 and then pushed into this. The control of the stocking or un-stocking is process-controlled by means of an operating console 12 shown schematically here, with which specific compartment locations in the rack 2 can be selected. A height sensor 22 can also be provided in the stocking/un-stocking opening 5, which detects the height of the stored goods carrier 3 to be loaded and assigns this to a suitable place. This gives a variable height and storage place usage in the storage device 1.

The height sensor 22 is formed by a so-called light curtain, which is formed by a plurality of uniformly disposed light barriers on the sidewalls 15 of the stocking/un-stocking opening 5. Above this height sensor 22 and thus on the upper edge of the stocking/un-stocking opening 5 there is provided a protective device 6 in the form of a switch rail, which stops the drive 9 for the feed platform 4 when actuated by engagement with the hand of an operator or by falling goods for example. This protective device 6 is coupled in the normal way to a safety switch 10 which is connected on the one hand to a control element 11 for the immediate top and optionally a reversing movement. This protective device 6 can also be formed by a light barrier, especially because excessively frequent actuation is not to be anticipated with the recessed arrangement compared with the state of the art. A protective device 6 constructed the same way in principle is arranged on the underside of the feed platform 4 movable in height, in the form of a switch rail 13. The switch rail 13 disposed towards the stocking/un-stocking opening 5 can also be connected to a further safety switch 10 and the control element 11. The switch rail 13 thus serves as a safety device for the movement of the feed platform 4 from above to the stocking/un-stocking plane 7. Suitable brakes or pawls—not shown in detail—on the drive 9 or associated drive parts, such as the drive chains 9a for the movement in height of the feed platform 4 can be provided for the immediate stop of the drive 9.

Chain drives 19 are provided at the side edges 14 of the feed platform 4 to stock/un-stock particular stored goods carriers 3, with which the current stored goods carriers 3 can be received from the stocking/un-stocking opening 5 or be pushed on to this. In order to be able to make engagement with the current stored goods carrier 3 on the stocking/un-stocking plane 7 (cf. FIG. 3), a region of overlap 21 of the chain drives 19 with the racks 2 is necessary at the sides. This region is exposed in the state of the art and thus forms a source of danger for the operator. This side region at the lower ends of the sidewalls 15 of the stocking/un-stocking opening 5 at the level of the stocking/un-stocking plane 7 is now covered in accordance with the novelty by side covers 8. These covers 8 are mounted movably, to that they can move in common with the stocking/un-stocking movement of the stored goods carrier 3 and are also coupled to safety switches 10 for stopping the drive 9.

A sectional diagram of the storage device 1 according to FIG. 1 is shown in FIG. 2, where the arrangement of the two racks 2 and the feed platform 4 is apparent in particular. Furthermore the formation of the cover 8 is apparent therefrom, namely with an incline 18 towards the stocking/un-stocking opening 5, so that when pushing in a stored goods carrier 3 by hand, by means of a robot or other rack serving apparatus, the cover 8 can move in the vertical and/or horizontal direction and actuates the associated safety switch 10 through this movement out of the way, in order to stop the drive.

As is shown enlarged in FIG. 3, the cover 8 is movably mounted on a slide guide 17 on the outside of each sidewall 15. A grip-shaped engagement profile 23 is formed on each side edge of the stored goods carrier 3 here indicated on the stocking/un-stocking plane 7, which comes into contact with the incline 18 of the cover 8 with further insertion on the stocking/un-stocking plane 7. The cover 8 is hereby pushed up on the slide guide 17 or on the pins 16 arranged on the sidewalls 15 (position 8') and thus comes into contact with a safety switch 10. This safety switch 10 is coupled, as with the protective device 6, to the control element 11 (or a separate one) for stopping the drive 9. With the cover 8 raised the stored goods carrier 3 can thus be brought into the region 21 of overlap with the chain drive 19, so that this can engage in the engagement profile 23 of the stored goods carrier 3 when actuated through one or more entraining elements 20. The vertical drive of the feed platform 4 is blocked.

DETAILED DESCRIPTION OF THE INVENTION

Removal is also effected by driving the chain drives 19, whereby the entraining elements 20 come out of engagement again. In the case of this un-stocking the cover 8 is also raised by the stored goods carrier 3, but as during stocking only when the side region is already covered by the stored goods carrier 3 to the extent that the operator can no longer reach into the chain drives 19 or their entraining elements 20. The vertical drive for the feed platform 4 is also blocked by this. The actuation of the covers 8 in the vertical and/or horizontal direction can also be effected by laterally projecting pins 24 on the stored goods carriers 3 or by outstanding levers 25 on the chain drives 19, which are operative during each stocking/un-stocking movement of the stored goods carriers 3.

All in all a safety device for storage devices thus results, with an optimum standard of safety, while unnecessary responses, as are frequently the case with front end "light curtains" are largely avoided and reliable operation of the mechanical cupboard during stocking/un-stocking is achieved.

What is claimed is:

1. A safety device, for use in a storage apparatus having a plurality of carriers for stored goods, an opening for stocking or unstocking goods on the carriers and a drive having drive elements for selectively moving the carriers to the opening, the opening having upper and lower edge, the lower edge being in the proximity of a plane in which the goods are stocked or unstocked, said device comprising:

a protective device associated with at least one of the upper and lower edges of the opening, and configured to stop the drive upon intervention, so that the opening is protected in a vertical direction; and said plane having side regions where covers are arranged and configured to cover the drive elements, the covers being movable together with the movement of the carriers and coupled to safety switches for stopping the drive.

2. The safety device of claim 1, wherein the protective device is a light barrier.

3. The safety device of claim 1, wherein the protective device is a switch rail.

4. The safety device of claim 1, wherein the safety device is part of the storage apparatus.

5. The safety device of claim 1, wherein the covers are configured to move in the vertical direction.

6. The safety device of claim 1, wherein the covers are configured to move in the horizontal direction.

7. The safety device of claim 1, wherein the covers each have an incline towards the opening.

8. The safety device of claim 1, wherein the protective device in the form of a switch rail is arranged on the lower edge of the feed platform adjacent the opening.

9. The safety of claim 4, wherein the storage device is formed by two racks, between which a feed platform is movable vertically.

10. The safety device of claim 9, wherein the opening is arranged in one of the racks.

11. The safety device of claim 4, wherein the opening is disposed at body height.

12. The safety device of claim 6, wherein the covers are mounted on slide guides.

13. The safety device of claim 9, wherein the drive comprises a chain drive, which is arranged at side edges of the feed platform and comprise entraining elements.

14. The safety device of claim 9, wherein the drive comprises a belt drive, which is arranged at side edges of the feed platform and comprise entraining elements.

15. The safety device of claim 10, wherein the covers cover a region in which the entraining elements and the carriers overlap.

16. The safety device of claim 14, wherein the covers are configured to move in the vertical direction.

17. The safety device of claim 14, wherein the covers are configured to move in a horizontal direction.

18. The safety device of claim 12, wherein the covers each have an incline towards the opening.

* * * * *